J. M. WEBB.
Apparatus for Preparing Coffee and Tea.

No. 221,376. Patented Nov. 4, 1879.

UNITED STATES PATENT OFFICE.

JACOB M. WEBB, OF SOMERVILLE, TENNESSEE.

IMPROVEMENT IN APPARATUS FOR PREPARING COFFEE AND TEA.

Specification forming part of Letters Patent No. 221,376, dated November 4, 1879; application filed August 11, 1879.

*To all whom it may concern:*

Be it known that I, JACOB M. WEBB, of Somerville, in the county of Fayette and State of Tennessee, have invented an Improved Apparatus for Preparing Coffee and Tea; and I do hereby declare that the following is a full and exact description thereof, reference being had to the accompanying drawings, making part of this specification—

Figure 1:
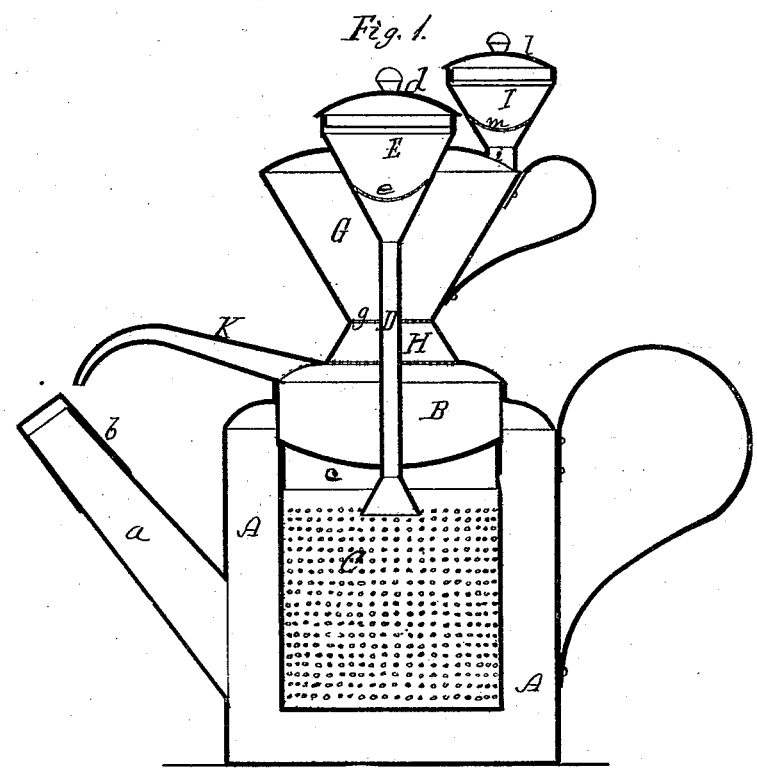
Figure 2:
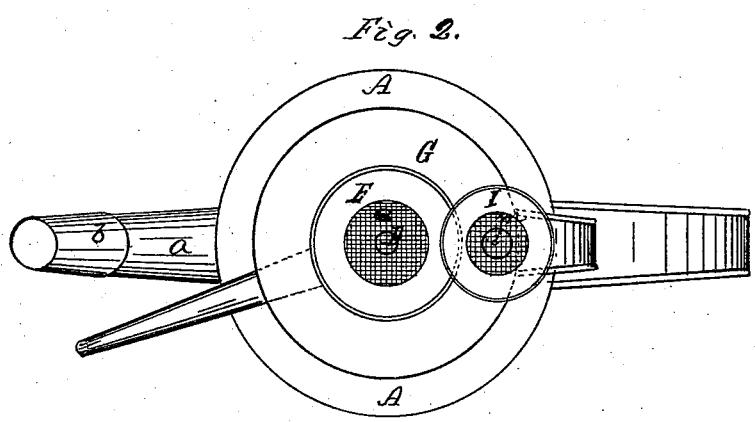

Figure 1 being a central vertical section of the apparatus as arranged for drawing or steeping coffee or tea; Fig. 2, a top view of the same.

Like letters designate corresponding parts in both figures.

My invention consists in the apparatus applied as a coffee or tea pot, and constructed substantially as follows:

In Figs. 1 and 2, A represents the body of a coffee-pot or tea-pot of any ordinary construction, the spout $a$ being provided with a removable cap, $b$, to prevent the escape of the aroma of the coffee or tea while steeping.

The apparatus consists of a condenser, a hot-water feeder, and a dripper combined, the whole being united so as to be used in connection with, and so formed as to fit into the top of, the coffee or tea pot, and serve for the time in place of the ordinary cover.

The body B of the condenser fits into the top of the body of the coffee or tea pot, and serves as the base or support of the other united parts. It has a downwardly-projecting flange, $c$, into which removably fits the dripper or digester C, which is thereby suspended therefrom within the body of the coffee or tea pot, and is made preferably of perforated sheet metal, as shown, but may be made of wire-gauze or other material, the perforations or meshes of which will not allow the escape of the particles of the coffee or tea, but will allow a free circulation of the water or liquid infusion through them. Vertically through the middle of the condenser B extends a pipe, tube, or passage, D, through which the hot water is poured into the dripper C to fill the coffee or tea pot as full as required. At the upper end of the tube is a hot-water-receiving funnel, E, which preferably has a strainer, $e$, to arrest impurities, and it has a close-fitting cover, $d$.

Around the tube D, and, as shown, around a part of the funnel E and above the body B of the condenser, is a conical cold-water conductor and condensing-chamber, G, the narrow bottom of which, as at $g$, is perforated to prevent the descent of impurities into the body of the condenser, between which and the said conducting-chamber I generally make an annular chamber or passage, H, though this is not essential. If employed, the bottom thereof also is preferably perforated where it empties into the body of the condenser. The top of this condensing-chamber G is permanently closed tight; but into its upper part a pipe or passage, $i$, leads from a funnel, I, through which the cold water is poured to supply the condensing-chamber G and condenser B. This funnel also has a cover, $l$, and a strainer, $m$.

The condensing-chamber B is entirely inclosed and water-tight; but it has an outlet tube or pipe, K, which terminates in a narrow opening at the end. Through this pipe the water escapes as it becomes warm, and cold water poured into the funnel I forces it out of the condenser. Any vessel or receiver may catch the water as it flows from the pipe K.

With the apparatus constructed substantially as above described the making of coffee or tea is as follows:

The ground coffee or tea is first placed in the dripper C, which is then attached to the lower flange of the condenser B, and the whole apparatus is then placed in the top of the body or pot A, closing the same as a cover. Hot water, as much as required, is then poured into the funnel E, and it runs down through the pipe D into the dripper C, percolating through the coffee or tea, and fills the body or pot A as full as desired, thus acting first to draw and then to steep the coffee or tea. The cover is put on the funnel E, and then cold water is poured into the funnel I, from which it flows first through the conducting and condensing chamber G, and then into the condenser B. Thus while the coffee or tea is steeping the entire surface of the condenser B within the pot A and the whole surface of the tube or pipe D, all the surface to which the rising vapors and aroma are principally exposed, continually act to condense the same and to cause them to flow or drip back into the liquid coffee or tea, and thus perfectly preserve the flavor thereof and retain its heat.

The water in the condenser B and condensing-chamber G is to be kept cool during the steeping, and to this end it is generally best to pour a small quantity of cold water into the funnel I two or three times, the warmed water in the condenser flowing out through the discharge-pipe K as additional cold water is poured into the funnel I.

After the coffee or tea has become sufficiently steeped and ready for the table the apparatus is taken from the body or pot A and an ordinary cover fitted into the top opening thereof.

What I claim as my invention, and desire to secure by Letters Patent, is—

1. The combination of a condenser, B, provided with a water-discharge spout, K, and with a hot-water-feeding tube or passage, D, extending through it, with a dripper, C, suspended therefrom, and a coffee-steeping pot or vessel, A, substantially as and for the purpose herein specified.

2. In an apparatus for preparing coffee and tea, a condenser, B, provided with a water-discharge spout, K, and with a hot-water-feeding tube or passage, D, extending through it, and having an upper auxiliary chamber, G, surrounding the hot-water pipe or passage, substantially as and for the purpose herein specified.

The foregoing specification signed by me this 30th day of April, 1879.

JACOB M. WEBB.

Witnesses:
 WM. C. OLD,
 E. R. TATUM.